United States Patent
Lane

(10) Patent No.: US 12,179,950 B2
(45) Date of Patent: Dec. 31, 2024

(54) STOPPER FOR FOOD JAR

(71) Applicant: Thermos L.L.C., Schaumburg, IL (US)

(72) Inventor: Marvin Lane, Brandon, MS (US)

(73) Assignee: Thermos L.L.C., Schaumburg, IL (US)

(*) Notice: Subject to any disclaimer, the term of this patent is extended or adjusted under 35 U.S.C. 154(b) by 261 days.

(21) Appl. No.: 17/730,803

(22) Filed: Apr. 27, 2022

(65) Prior Publication Data

US 2022/0348370 A1 Nov. 3, 2022

Related U.S. Application Data

(60) Provisional application No. 63/180,770, filed on Apr. 28, 2021.

(51) Int. Cl.
  *B65B 31/04* (2006.01)
  *A47J 47/02* (2006.01)
(52) U.S. Cl.
  CPC ............. *B65B 31/04* (2013.01); *A47J 47/02* (2013.01)
(58) Field of Classification Search
  CPC .. B65B 31/04; B65D 51/1661; B65D 51/1644
  See application file for complete search history.

(56) References Cited

U.S. PATENT DOCUMENTS

| | | | |
|---|---|---|---|
| 3,378,168 A * | 4/1968 | Hildebrandt | B65D 81/3216 222/546 |
| 3,708,083 A * | 1/1973 | Gronemeyer | B65D 41/485 215/213 |
| 5,108,001 A * | 4/1992 | Harris | B60K 15/0406 220/203.26 |
| 8,985,406 B2 | 3/2015 | Tachi | |
| 9,211,040 B2 | 12/2015 | Lane | |
| 9,351,597 B2 | 5/2016 | Liu et al. | |
| 9,675,191 B2 | 6/2017 | Kurabe et al. | |
| 10,329,061 B2 | 6/2019 | Dias et al. | |
| 10,899,512 B2 | 1/2021 | Lane | |
| 2006/0096985 A1 * | 5/2006 | Stolzman | B65D 51/1644 220/259.2 |
| 2014/0091097 A1 | 4/2014 | Lane | |
| 2015/0197390 A1 | 7/2015 | Kurabe et al. | |
| 2015/0284138 A1 | 10/2015 | Lane et al. | |
| 2018/0273259 A1 | 9/2018 | Lane | |
| 2019/0308782 A1 | 10/2019 | Lane | |
| 2020/0055645 A1 | 2/2020 | Lane | |
| 2020/0231345 A1 | 7/2020 | Lane et al. | |
| 2021/0053731 A1 | 2/2021 | Lane | |

OTHER PUBLICATIONS

International Search Report for PCT/US22/25884 dated Aug. 23, 2022, 2 pages.
Written Opinion for PCT/US22/25884 dated Aug. 23, 2022, 6 pages.
Office Action issued on Mar. 19, 2024 for corresponding Canada Application No. 3,156,535 (7 pages).

* cited by examiner

*Primary Examiner* — Timothy P. Kelly
(74) *Attorney, Agent, or Firm* — Polsinelli PC

(57) ABSTRACT

A stopper for a food jar is described that may be used to store and transport food items. The stopper includes a bottom wall and a sidewall. The stopper includes one or more vent passages connecting the bottom wall and the sidewall to provide pressure relief. A vent gasket is provided at the bottom wall that opens when pressure inside of the container is elevated to allow air to pass into the vent passages and vent outside of the container.

20 Claims, 7 Drawing Sheets

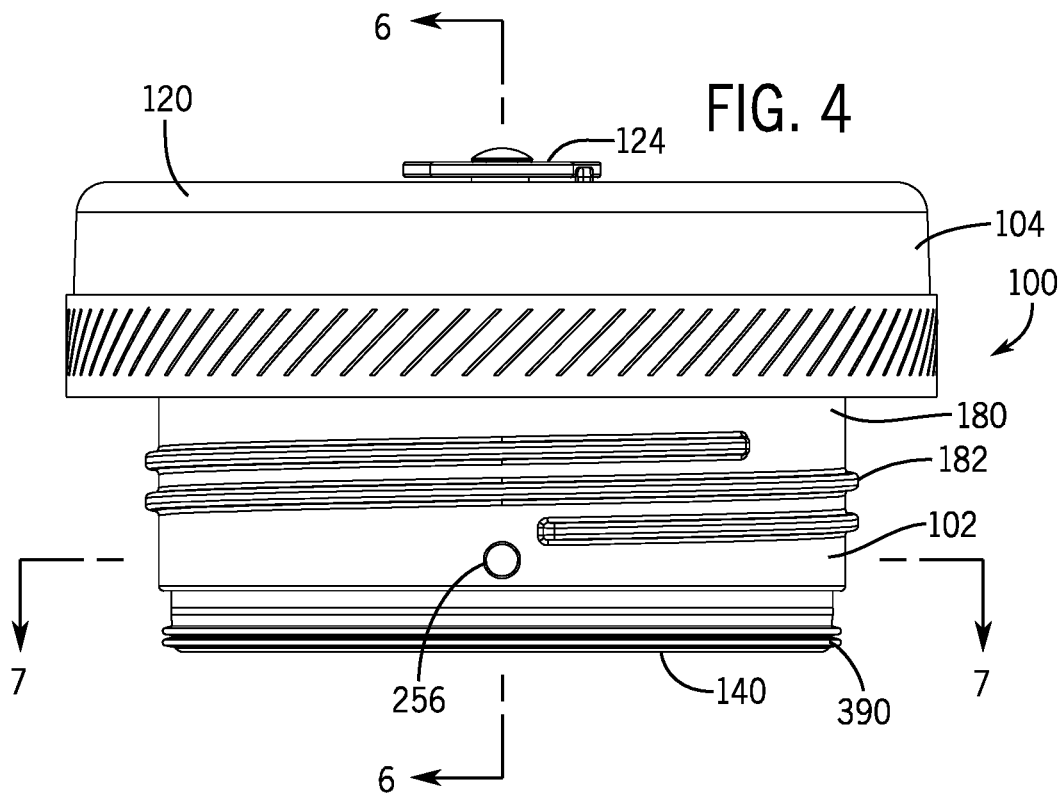
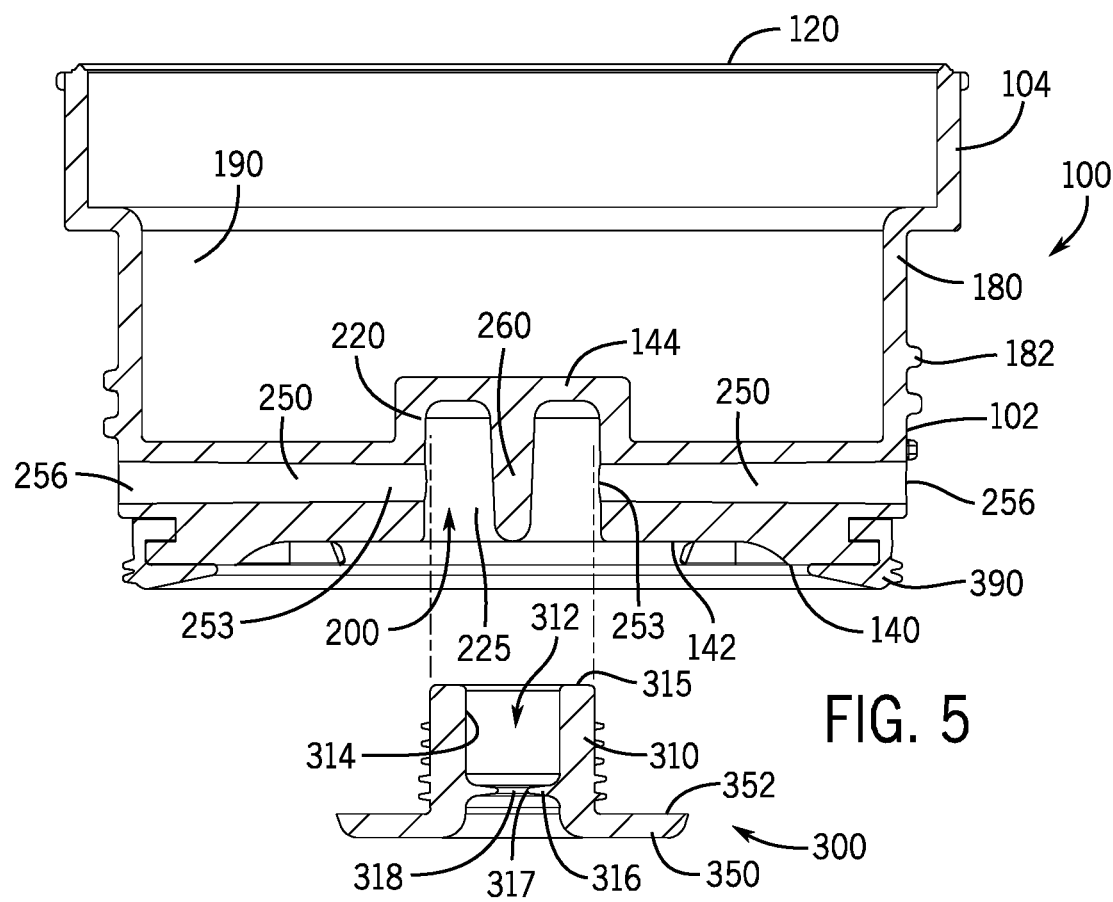

STOPPER FOR FOOD JAR

This application claims priority to U.S. Provisional Patent Application No. 63/180,770 filed Apr. 28, 2021.

FIELD OF INVENTION

The present invention relates to a stopper for a food jar.

BACKGROUND

Food containers are often used to store and transport food items. High pressure formed within the food containers may lead to unwanted ejection of food or liquids from the food container. For example, certain food items will increase pressure in the container if the container and the food item are agitated. In addition, for example, after prolonged storage of food items in the container, certain spoiled food items will release gases into the container that will increase pressure in the container. These high pressures may lead to inadvertent ejection of food or liquid spray when the food container is opened.

SUMMARY

A stopper for a food jar is described that may be used to store and transport food items or drink items. The stopper functions with a variety of containers including insulated or uninsulated structures to store the food items, possibly at warmed or chilled temperatures for later consumption.

The illustrated embodiment of the stopper for a food jar includes a bottom wall and a sidewall. The stopper includes one or more vent passages connecting the bottom wall and the sidewall to provide pressure relief. A vent gasket is provided at the bottom wall that opens when pressure inside of the container is elevated. At normal pressures, the vent gasket generally prevents or minimizes leakage via the vent passages.

The stopper closes an opening of the container. The container includes an interior to store a food item or could be configured to store beverage items. The vent passages open to relieve air pressure within the container. The vent passages provide for gas to pass through the stopper in an outgoing direction from the container in order to relieve air pressure.

The vent passages relieve pressure within the container before the lid is removed. The pressure relief helps to minimize the likelihood of a lid coming off forcefully or at least minimizes the force upon the lid release. The pressure relief helps to minimize the likelihood of food contents ejecting or spraying from the container. For example, if a high pressure is formed in the container from agitation or prolonged storage of food items, then the vent passages will release the high pressure in a controlled manner with minimal spray or release of the food product.

In another aspect, a stopper for a food jar includes a stopper configured to close an opening of a container. The stopper includes a top wall, a bottom wall, and a sidewall. The top wall is generally opposite of the bottom wall, and the sidewall joins the top wall and the bottom wall. A central recess is formed in the bottom wall. One or more vent passages pass through an interior of the stopper. The one or more vent passages connect to the central recess and to the sidewall. A vent gasket is configured to position in the central recess. The vent gasket is configured to selectively open and close the one or more vent passages in response to a pressure differential between an ambient atmosphere of the container and an interior of the container.

In another aspect, a stopper for a food jar includes a stopper configured to close an opening of a container. The stopper includes a bottom wall and a sidewall. A central recess is formed in the bottom wall. The central recess includes a cylindrical wall defining a void. One or more vent passages connect the central recess and the sidewall. A positioner extends from the bottom wall and into the void of the central recess. A vent gasket is configured to at least partially fit into the void of the central recess. The vent gasket includes a cylindrical portion. The cylindrical portion of the vent gasket defines a central open portion configured to receive the positioner. The cylindrical portion includes a flexible gasket flap configured to touch or seal against the positioner. The flexible gasket flap is configured to deflect or bend in response to a pressure differential between an inside of the container and an ambient atmosphere of the container, thereby releasing pressure.

In another aspect, a stopper for a food jar includes a stopper configured to close an opening of a container. The stopper includes a bottom wall and a sidewall. A central recess is formed in the bottom wall. The central recess includes a cylindrical wall defining a void. One or more vent passages are formed in the bottom wall. The one or more vent passages have a first opening at the central recess and a second opening in the sidewall. The one or more vent passages connect the central recess and the sidewall. A seal is engaged to a lower portion of the stopper below the second opening in the sidewall. A positioner extends from the bottom wall and into the void of the central recess. A vent gasket is configured to at least partially fit into the void of the central recess. The vent gasket defining a central open portion configured to receive the positioner. The central open portion includes a flap configured to seal against the positioner and to automatically open under higher than ambient pressure conditions to relieve pressure.

BRIEF DESCRIPTION OF DRAWINGS

FIG. 4 is a side view of the stopper.
FIG. 5 is a sectional view of the stopper.

DETAILED DESCRIPTION OF INVENTION

For purposes of this application, any terms that describe relative position (e.g., "upper", "middle", "lower", "outer", "inner", "above", "below", "bottom", "top", etc.) refer to an embodiment of the invention as illustrated, but those terms do not limit the orientation in which the embodiments can be used.

A stopper 100 for a food jar 50 will now be described with reference to FIGS. 1-10. The stopper 100 in combination with a container 60 forms the food jar 50. The stopper 100 includes one or more vent passages 250 that provides for gas to pass through the stopper 100. This allows interior pressure within the container 60 to equalize with ambient pressure.

Figure 8:
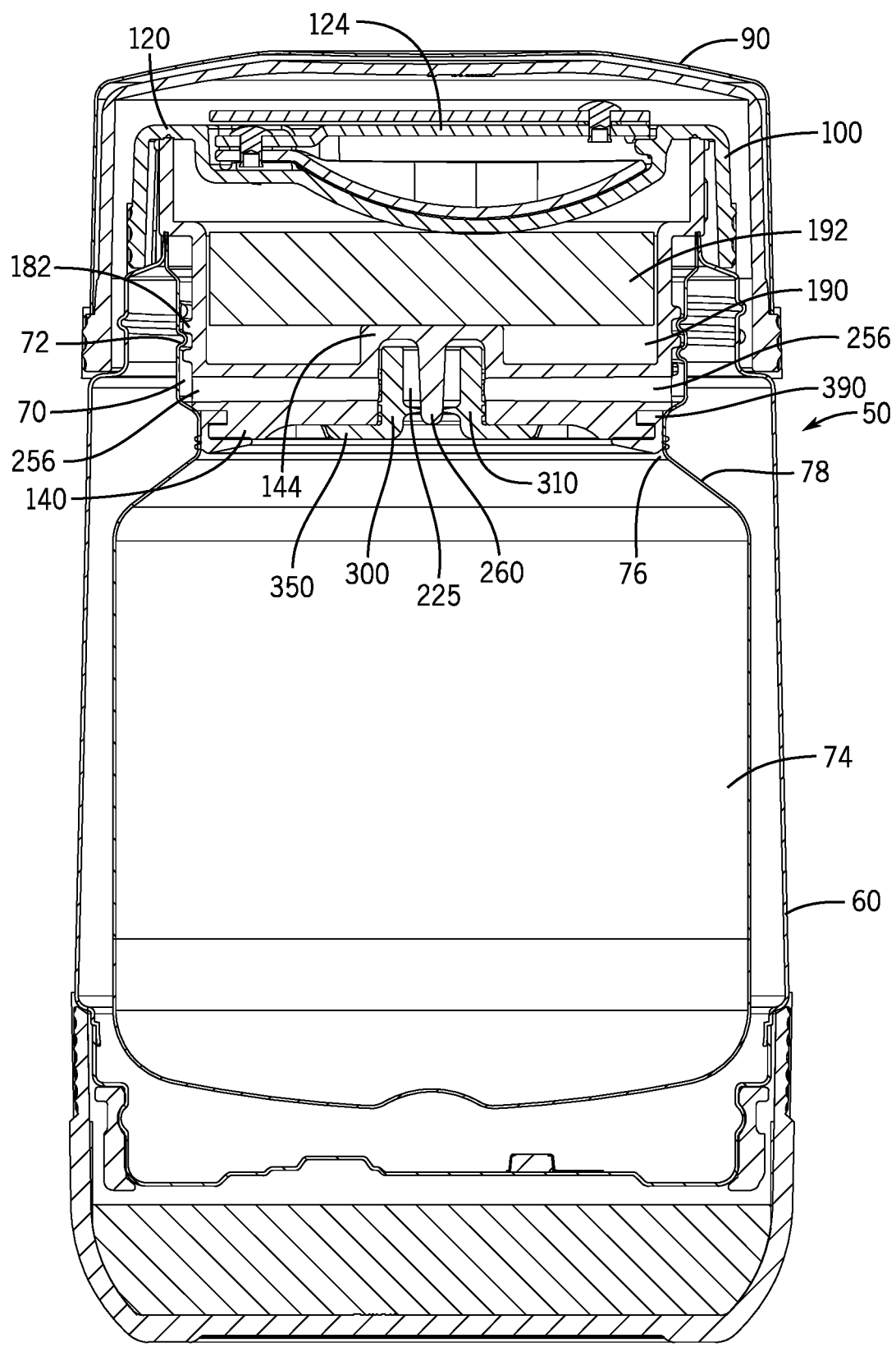
FIG. 8 is a sectional view of the stopper engaged to the container.

With reference to FIG. 8, the stopper 100 closes an opening 70 of the container 60. The container 60 includes a wide mouth opening to readily accept food items such as stews, chili, soups, beverages, or other foods that might not fit so easily into a narrow mouth container. The container 60 may be vacuum insulated or insulated with an insulating material. The opening 70 leads into an interior 74 of the container 60 that holds the food items.

In this aspect, the stopper 100 includes a generally round shape. The stopper 100 includes a top wall 120 that is generally opposite of a bottom wall 140. A sidewall 180 joins the top wall 120 and the bottom wall 140. In this aspect, the sidewall 180 is integrally molded with the bottom wall 140, but in other aspects, the bottom wall 140 and sidewall 180 may be formed from two or more components and attached together. The stopper 100 may include an interior 190 with insulation 192.

In this aspect, the sidewall 180 includes exterior threads 182 to threadably engage interior threads 72 facing the opening 70 of the container 60 of the food jar 50. In this aspect, the sidewall 180 includes a varying outer dimension with a narrower dimension closer to a bottom portion 102 of the stopper 100 and a larger dimension closer to an upper portion 104 of the stopper 100.

In other aspects, the sidewall 180 or other portion of the stopper 100 may include interior threads to threadably engage exterior threads of the container 60 of the food jar 50. In other aspects, the stopper 100 and the container 60 may include any complementary engaging structures such as snap-fit engagement, frictional engagement, bayonet engagement, or other engagements configured to removably attach the stopper 100 to the container 60.

The stopper 100 includes a central recess 200 that is formed in the bottom wall 140. The one or more vent passages 250 connect with the central recess 200. The vent passages 250 radiate outward from the central recess 200 to the sidewall 180.

In this aspect, the vent passages 250 are integrally molded into the bottom wall 140 of the stopper 100. In a high-pressure situation within the container 60, air or gas in the interior 74 may exit the container 60 through the vent passages 250.

In other aspects, the vent passages 250 may include channels or pathways bored into, drilled into, otherwise formed in the stopper 100. In other aspects, the vent passages 250 may include piping, tubing, or other conduits fluidly connecting the central recess 200 and the sidewall 180 or another surface of the stopper 100.

In this aspect, two vent passages 250 are horizontally disposed and arranged generally perpendicular to a central vertical axis of the stopper 100. In this aspect, the vent passages 250 are formed proximate the bottom portion 102 of the stopper 100. In this aspect, the vent passages 250 are molded in the bottom wall 140. The vent passages 250 include a first opening 253 at the central recess 200, and the vent passages 250 further include a second opening 256 at the sidewall 180 of the stopper 100. The first opening 253 communicates with the interior 74 of the container 60 and the second opening 256 communicates with the ambient environment or a pathway thereto to relieve pressure from the interior 74 of the container 60. In this aspect, the vent gasket 300 covers the first opening 253 to selectively open and close the first opening 253.

A length of the vent passages 250 connects the first opening 253 and the second opening 256. The second opening 256 may be formed in or between the exterior threads 182 of the stopper 100. In other aspects, the second opening 256 may be formed just above or just below the exterior threads 182.

In other aspects, the stopper 100 includes a single vent passage 250. In other aspects, the stopper 100 includes three, four, or more vent passages 250. The number of vent passages 250 may be designed to correspond with different types of uses (e.g. if certain types of food or longer use containers may build more pressure and require more passages), different size containers (e.g., if larger containers may build more pressure and require more passages), or otherwise designed in line with the needs of the container. Also, the diameter or size of the vent passages may be sized to accommodate more or less pressure relief, if needed for certain types of containers or containers likely to build up additional pressure.

Figure 10:
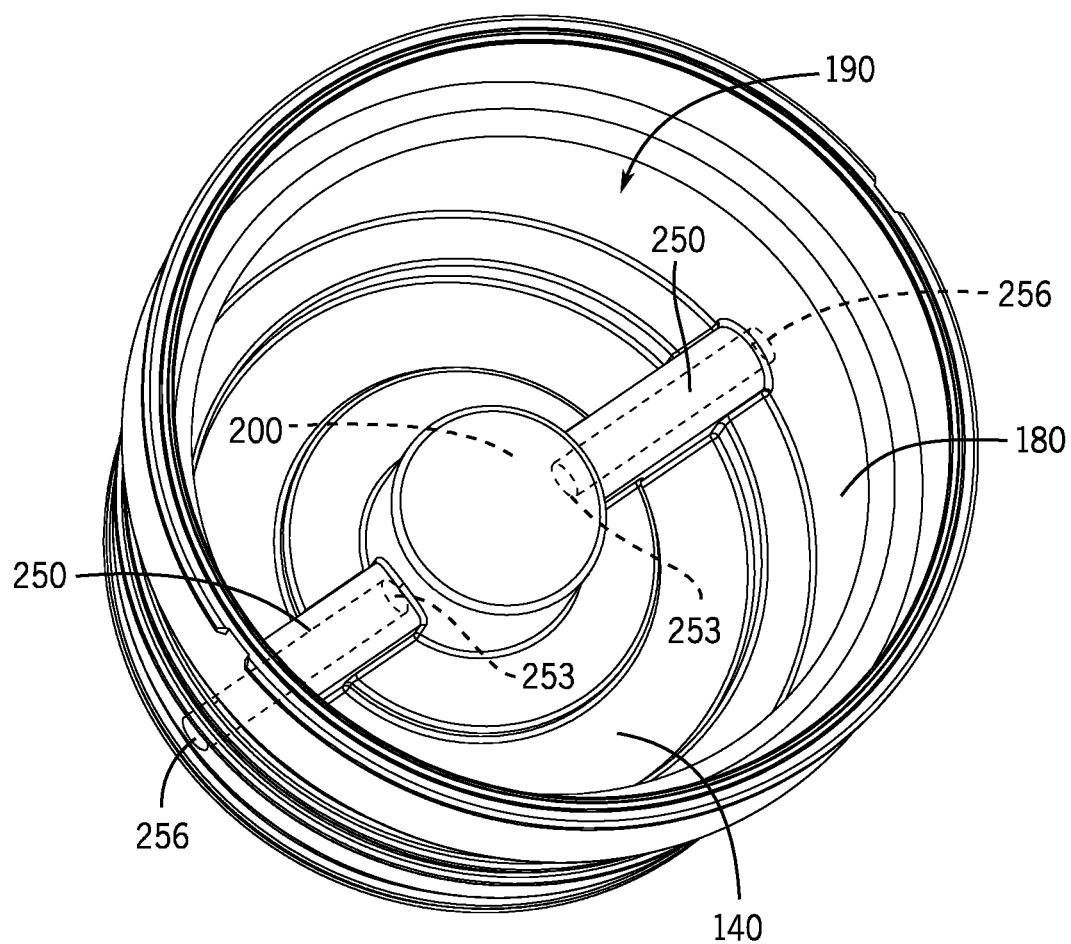
FIG. 10 is a perspective view of an embodiment of the stopper with the top wall and insulation removed to show the vent passages.

With respect to FIG. 10, the stopper 100 is shown with the top wall 120 and the insulation 192 removed in order to reveal the two vent passages 250. In this aspect, the two vent passages 250 extend outward from the central recess 200 to the sidewall 180.

In this aspect, the central recess 200 is formed in the bottom wall 140 of the stopper 100. The central recess 200 includes a cylindrical wall 220 defining a void 225. A positioner 260 extends into the central recess 200 from a recessed portion 144 of the bottom wall 140.

In this aspect, a vent gasket 300 is positioned in the central recess 200 of the stopper 100 and engages the positioner 260. The vent gasket 300 is configured to selectively open and close the one or more vent passages 250. The vent gasket 300 includes a support portion 310 (configured as a cylindrical portion in this aspect) and a flange portion 350. The cylindrical portion 310 receives the positioner 260. The vent gasket 300 is configured to at least partially fit into the void 225 of the central recess 200. The vent gasket 300 is configured to selectively open and close the one or more vent passages 250 in response to a pressure differential between an ambient atmosphere of the container 60 and the interior 74 of the container 60. The vent gasket 300 is configured to automatically deflect to release gas from the container 60 when a sufficient amount of pressure or vacuum builds in the container 60 or when the pressure differential between the interior 74 of the container 60 and the ambient atmosphere is sufficient.

Figure 1:
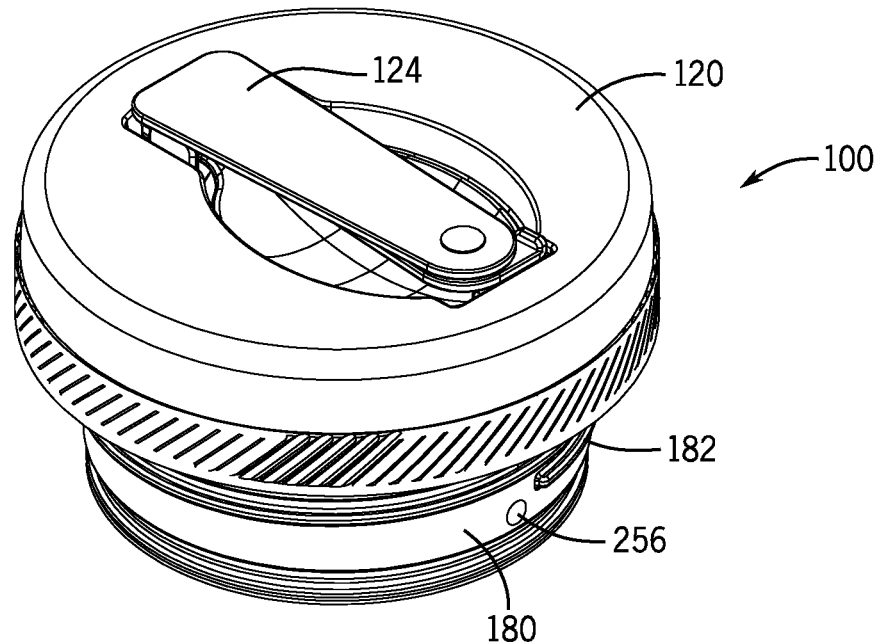
FIG. 1 is an upper perspective view of the stopper.
Figure 2:
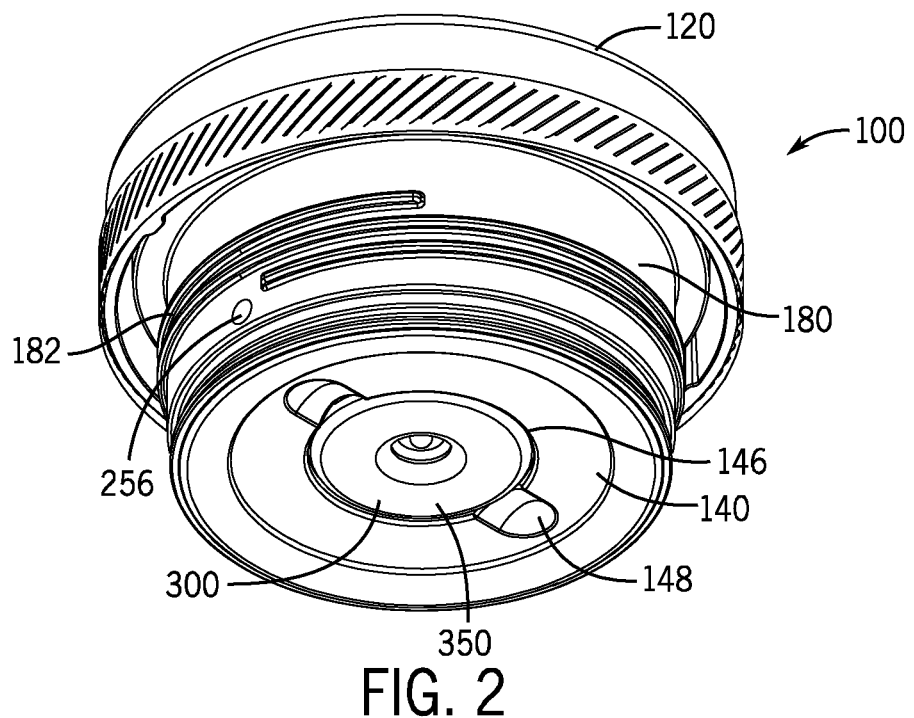
FIG. 2 is a lower perspective view of the stopper.
Figure 3:
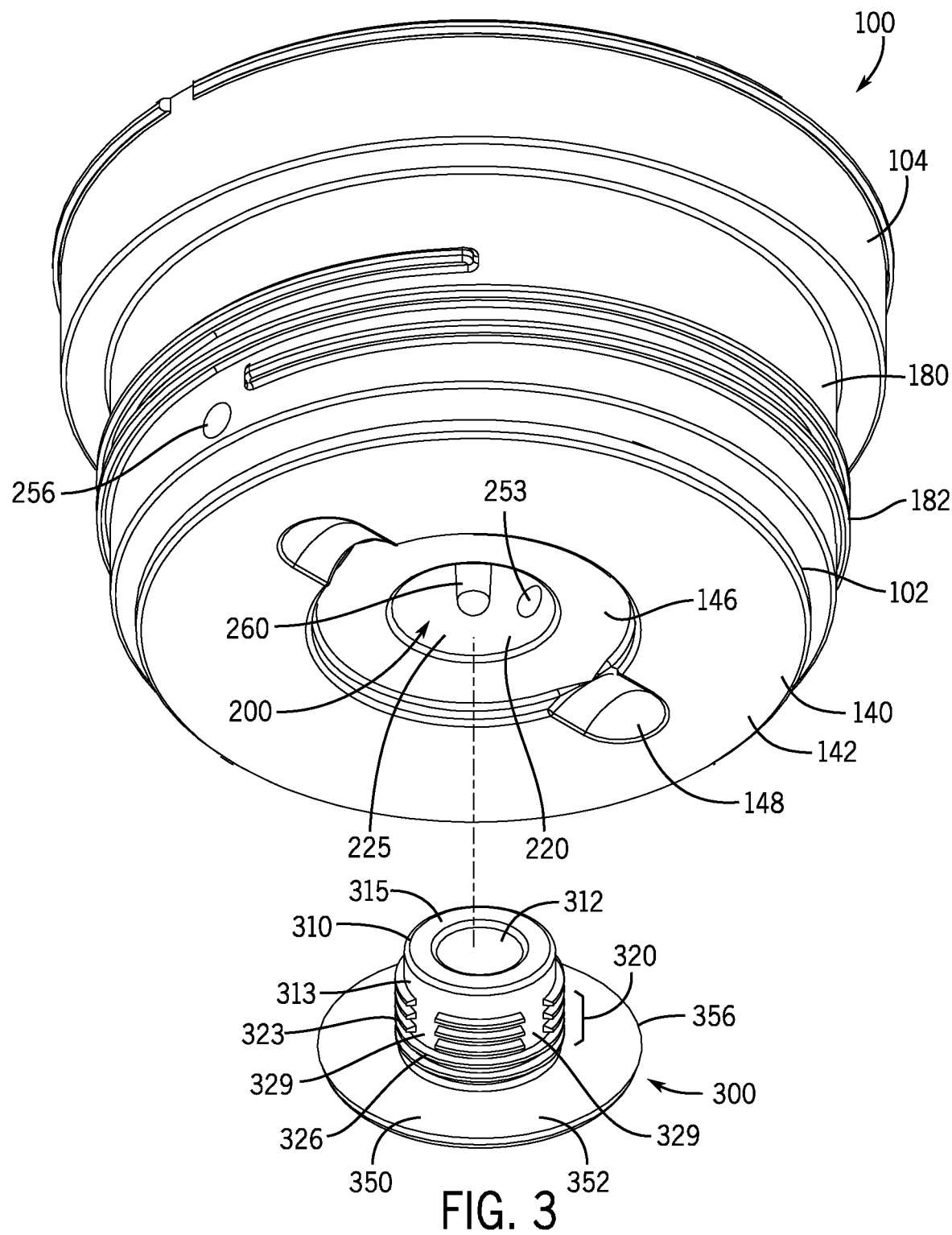
FIG. 3 is a lower perspective view of the stopper.
Figure 6:
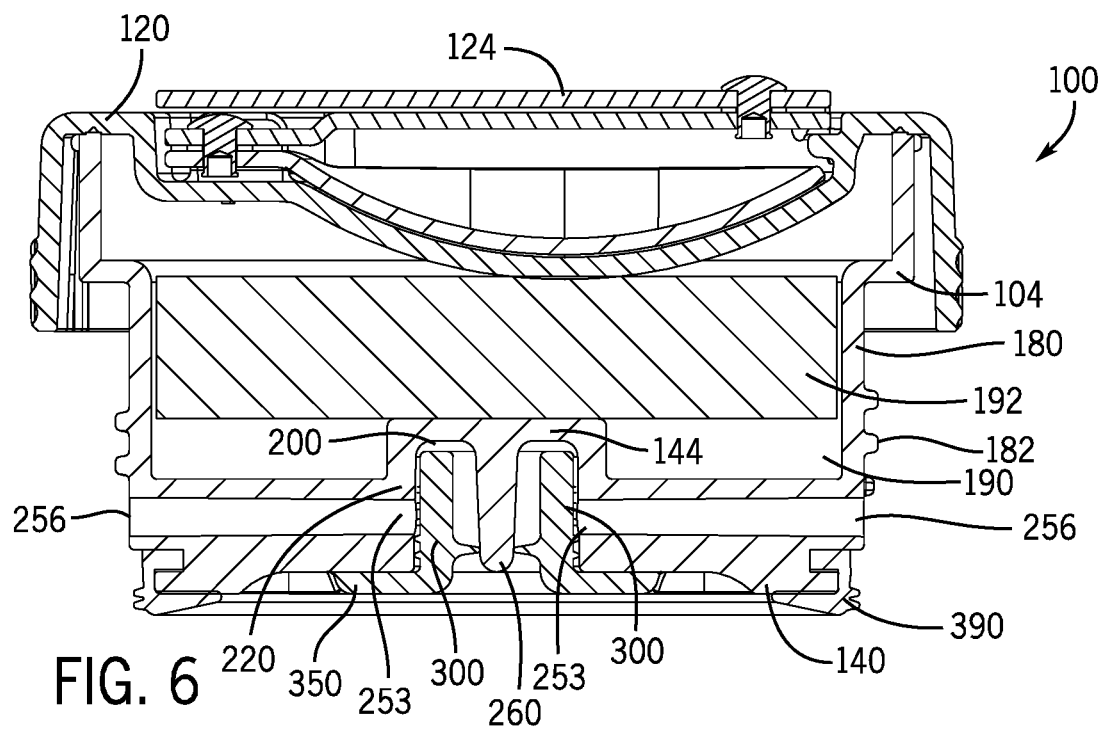
FIG. 6 is a sectional view of the stopper.
Figure 7:
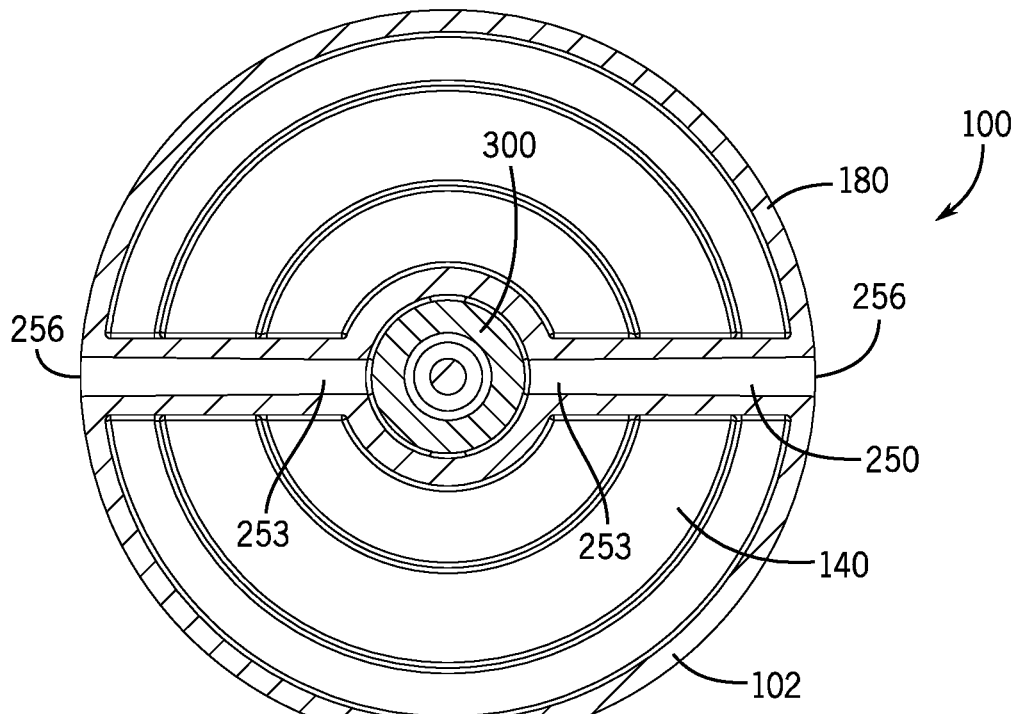
FIG. 7 is a sectional view of the stopper.

In this aspect, the flange portion 350 is integral with the cylindrical portion 310. With reference to FIG. 3, an exterior surface 313 of the cylindrical portion 310 includes one or more fins 320 that seal against the cylindrical wall 220 of the central recess 200. The one or more fins 320 may include radial-shape segments and/or circular members extending from the exterior surface 313. The one or more fins 320 may be spaced vertically on the exterior surface 313 of the cylindrical portion 310. With respect to FIG. 3, in this aspect, the exterior surface 313 includes a combination of radial-shape segments 323 and circular members 326. In this aspect, gaps 329 are formed in between adjacent radial-shape segments 323 to provide for flow or movement of air in order to provide the pressure-relief function. In other aspects, the one or more fins 320 may include notches or gaps proximate the first opening 253 of the vent passages 250 to promote pressure relief and air flow.

In this aspect, the cylindrical portion 310 defines a central open portion 312. With reference to FIG. 5, an inner surface 314 of the cylindrical portion 310 faces the central open portion 312. The inner surface 314 includes a gasket flap 316 that extends inward from the inner surface 314 of the cylindrical portion 310. A distal edge 317 of the gasket flap 316 defines an opening 318. When the vent gasket 300 is installed in the stopper 100, the gasket flap 316 touches or seals against the positioner 260. The gasket flap 316 is flexible and is configured to deflect or bend in response to a pressure differential between the interior 74 of the container 60 and the ambient atmosphere of the container 60, thereby releasing pressure. In this aspect, the gasket flap 316 bends upward to release pressure from the container 60. In other aspects, the gasket flap 316 may deflect or bend to admit air into the interior 74 of the container 60, such that a vacuum may be reduced within the interior of the container 60.

In this aspect, an upper surface 352 of the flange portion 350 abuts or seals against a lower surface 142 of the bottom wall 140. In this aspect, the bottom wall 140 includes a first indentation 146 shaped and configured to receive the flange portion 350. The first indentation 146 may include a complementary shape that is slightly larger than an outer diameter 354 of the flange portion 350 such that the flange portion 350 nests within the first indentation 146. The lower surface 142 may include second indentations 148 that are touching or contiguous with the first indentation 146. The second indentations 148 provide an access point for the user's finger to grip or pull on an outer edge 356 of the flange portion 350 in order to remove the vent gasket 300 from the stopper 100.

During use, the vent gasket 300 fits into the central recess 200. The vent gasket 300 is configured to selectively open and close the vent passages 250. With respect to FIG. 5, the vent gasket 300 positions in the void 225 of the central recess 200. The positioner 260 inserts into the central open portion 312 of the cylindrical portion 310 and into or through the opening 318 formed by the gasket flap 316. The positioner 260 may include a peg, descending member, stopper, plug, extension, etc. positioned at the bottom portion 102 of the stopper 100 that inserts into, seals, blocks, or otherwise closes the opening 318 formed by the gasket flap 316. The distal edge 317 of the gasket flap 316 contacts an exterior surface of the positioner 260. The one or more fins 320 on the exterior surface 313 of the cylindrical portion 310 seal against the cylindrical wall 220 of the central recess 200.

The vent gasket 300 is made of resiliently flexible material that seals against the positioner 260. The size, thickness, and the specific material forming the gasket flap 316 may be adjusted or changed to modulate the amount pressure needed to actuate the gasket flap 316.

Figure 9:
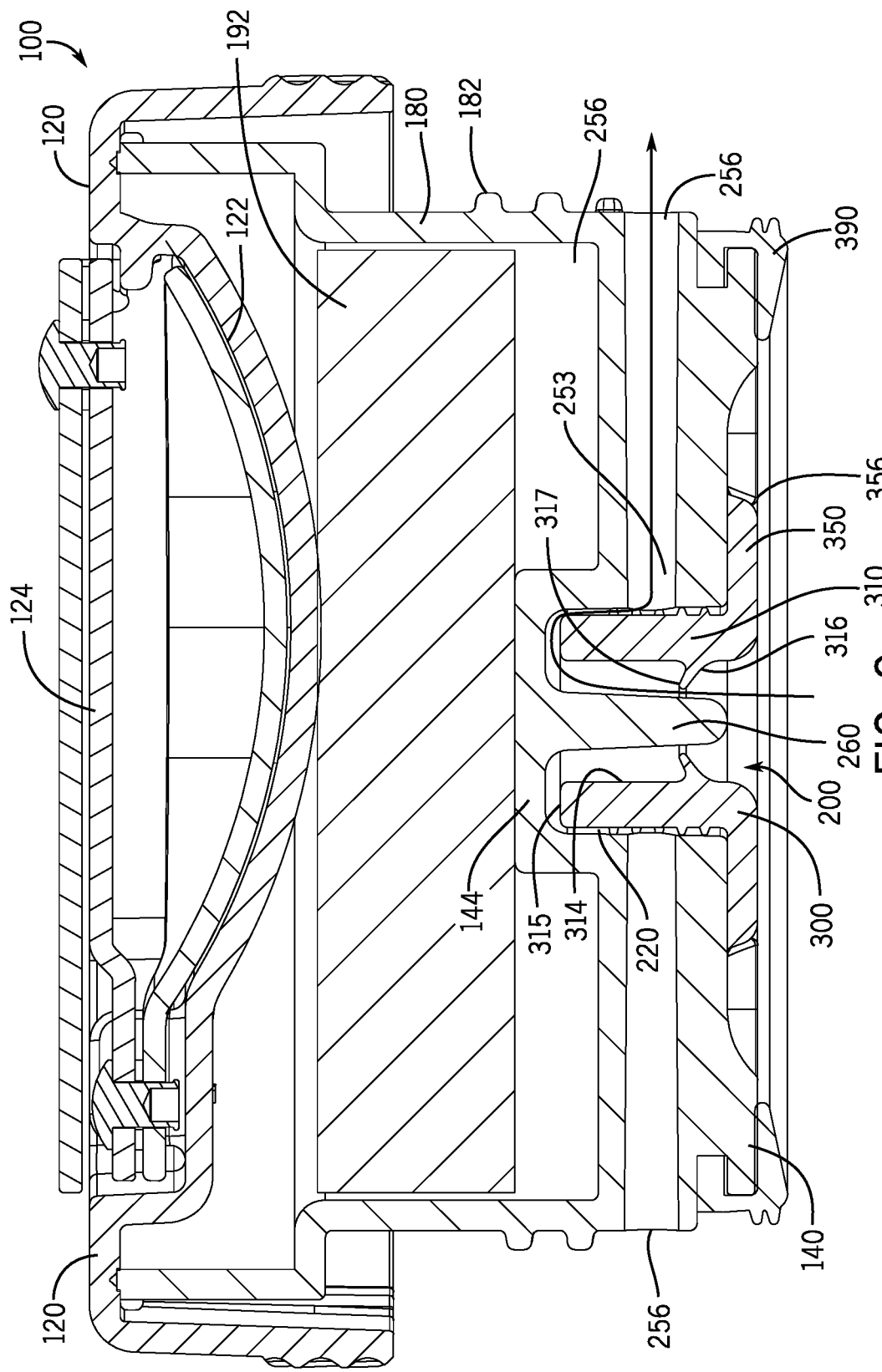
FIG. 9 is a sectional view of the stopper showing a flow path.

With reference to FIG. 9, a flow-path of air is illustrated for pressure relief. When pressure increases in the food jar 50, the pressure may exhaust via the vent passages 250. In this aspect, the pressure will cause the gasket flap 316 to deflect upwards, and air will pass between the gasket flap 316 and the positioner 260. The air will pass over a top surface 315 of the cylindrical portion 310. The air will pass downward between cylindrical wall 220 and the cylindrical portion 310. The air will enter the first opening 253, travel through the vent passage 250, and out the second opening 256 at the sidewall 180 of the stopper 100. The air will then exhaust to the atmosphere through the threaded connection between the exterior threads 182 of the sidewall 180 and the interior threads 72 of the container 60 of the food jar 50.

The vent passages 250 of the stopper 100 release pressure from within the container 60 before the stopper 100 is twisted off. The vent passages 250 of the stopper 100 provide for automatic pressure relief. The vent passages 250 of the stopper 100 release pressure or vent the interior 74 of the container 60 in a controlled manner. This is advantageous since there is a possibility that pressure may build up in the interior 74 of the container 60 if the container 60 has been agitated or the food has been stored in the container 60 too long. The vent passages 250 are able to relieve pressure within the container 60 without removing the lid 90, which helps reduce inadvertent food spray when the high pressure within the container 30 is relieved.

In this aspect, the stopper 100 is threadably engaged to the container 60. The stopper 100 seals the container 60 to a closed position. The stopper 100 also includes a seal 390 to seal against an internal surface 76 of a neck 78 of the container 60. The seal 390 may be positioned on a lower outer diameter of the stopper 100. As the stopper 100 is screwed to the container 60, the seal 390 is urged against the internal surface 76 of the neck 78 to seal the container 60 to the generally closed position. In this aspect, the seal 390 is positioned below the openings 235 and 256 of the vent passages 250, which permits the seal to help minimize leakage from the food jar when the lid is closed, but also does not prohibit the flow of pressure relief. The seal 390 generally prevents or reduces the likelihood of fluid leaking from the container 60 or reaching the openings 253 and 256 of the vent passages 250.

The stopper 100 may include a single piece construction or may be formed from multiple components. In this aspect, the stopper 100 includes the top wall 120, which is not normally removable during normal use. The top wall 120 may be glued, welded, mechanically engaged, or otherwise attached to the sidewall 180.

With reference to FIG. 8, the stopper 100 is shown closing the opening 70 of the container 60. An optional lid 90 is positioned over the stopper 100. In this aspect, the container 60 has a thermally insulated, double wall construction. In other aspects, the container 60 includes a non-insulated single-layer or multilayer construction or other insulated constructions. The container 60 may be formed from moldable food-grade plastics, thermoplastics, stainless steel, other metals and metal alloys, other plastics, or any combination thereof.

With reference to FIG. 9, the top wall 120 of the stopper 100 may include an optional depression 122 or other utensil holder to hold an optional eating utensil, such as a collapsible spoon 124 or other fork, knife, spoon, etc. In other aspects, the optional depression 122 may hold two optional eating utensils, such as two collapsible spoons 124 or other forks, knives, spoons, or combinations thereof. In other aspects, the top wall 120 of the stopper 100 may include a flat or curved surface with no depression. In other aspects, the upper portion 104 of the stopper 100 may be configured to hold condiments, drink additives, crackers, seasonings, and other food products. In other aspects, a different lid, drinking or eating cup, or cover may fit over or engage to the stopper 100.

In a normal position, with relatively equal pressures in the container 60 and in the ambient environment, the gasket flap 316 seals against the positioner 260 to close the vent passage 250. When the pressure in the container 60 elevates to a high-pressure condition, the flap 265 will deflect or move upward to release pressure from within the container 60. When the pressure is relieved, flap 265 will deflect or move downward to a resting or normal position. In the normal position, the gasket flap 316 extends generally inward against the outer surface of the positioner 260. In a high-pressure condition, the gasket flap 316 deflects upward— away from the outer surface of the positioner 260. By relieving the pressure, the vent gasket 300 helps to prevent the stopper 100 from moving upward or allowing spray while unscrewing the stopper 100 from the container 60.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A stopper for a food jar, comprising:
   a stopper, the stopper configured to close an opening of a container;
   the stopper includes a top wall, a bottom wall, and a sidewall, wherein the top wall is generally opposite of the bottom wall, and the sidewall joins the top wall and the bottom wall;
   a central recess formed in the bottom wall;
   one or more vent passages passing through an interior of the stopper;
   the one or more vent passages have a first opening at the central recess and a second opening in the sidewall;
   the one or more vent passages connect to the central recess and to the sidewall; and
   a vent gasket configured to position in the central recess, the vent gasket configured to selectively open and close the one or more vent passages in response to a pressure differential between an ambient atmosphere of the container and an interior of the container.

2. The stopper according to claim 1, wherein the one or more vent passages provide a conduit between the first opening and the second opening.

3. The stopper according to claim 1, wherein the vent passages are formed proximate a bottom portion of the stopper and the vent passages are molded in the bottom wall.

4. The stopper according to claim 1, wherein the vent passages are horizontally disposed and arranged generally perpendicular to a central vertical axis of the stopper.

5. The stopper according to claim 1, wherein the central recess includes a cylindrical wall defining a void, and a positioner extends into the central recess from the bottom wall.

6. The stopper according to claim 5, wherein the vent gasket includes a support portion and a flange portion, and the support portion is configured to receive the positioner.

7. The stopper according to claim 6, wherein an exterior surface of the support portion includes one or more fins that seal against the cylindrical wall of the central recess.

8. The stopper according to claim 6, wherein an inner surface of the support portion includes a gasket flap that seals against the positioner.

9. The stopper according to claim 8, wherein the gasket flap is configured to automatically deflect to release gas from the container when a sufficient amount of pressure or vacuum builds in the container or when the pressure differential between the interior of the container and the ambient atmosphere is sufficient.

10. The stopper according to claim 6, wherein the support portion defines a central open portion, an inner surface of the support portion faces the central open portion, the inner surface includes a gasket flap that extends inward from the inner surface of the support portion, and a distal edge of the gasket flap defines an opening, and the opening is configured to receive the positioner.

11. The stopper according to claim 1, wherein the vent gasket selectively covers the first opening.

12. A food jar comprising the container and the stopper according to claim 1, wherein the container defines an interior to store a food product, the container having an opening, and the stopper configured to close the opening.

13. A stopper for a food jar, comprising:
    a stopper, the stopper configured to close an opening of a container;
    the stopper includes a bottom wall and a sidewall;
    a central recess formed in the bottom wall, the central recess includes a cylindrical wall defining a void;
    one or more vent passages connecting the central recess and the sidewall;
    a positioner that extends from the bottom wall and into the void of the central recess;
    a vent gasket configured to at least partially fit into the void of the central recess;
    the vent gasket comprising a cylindrical portion;
    the cylindrical portion of the vent gasket defining a central open portion configured to receive the positioner, wherein an exterior surface of the cylindrical portion includes one or more fins configured to seal against the cylindrical wall of the central recess; and
    the cylindrical portion comprising a flexible gasket flap configured to touch or seal against the positioner, the flexible gasket flap configured to deflect or bend in response to a pressure differential between an inside of the container and an ambient atmosphere of the container, thereby releasing pressure.

14. The stopper according to claim 13, wherein the one or more fins include radial-shape segments or circular members extending from the exterior surface, and the radial-shape segments or circular members include notches or gaps proximate a first opening of the one or more vent passages.

15. The stopper according to claim 13, wherein the one or more vent passages have a first opening at the central recess and a second opening in the sidewall, and the one or more vent passages connecting the central recess and the sidewall.

16. The stopper according to claim 15, wherein a seal is engaged to a lower portion of the stopper below the second opening in the sidewall, thereby minimizing leakage of contents of the container and also not prohibiting release of air for pressure relief.

17. The stopper according to claim 13, wherein the cylindrical portion defines a central open portion, an inner surface of the cylindrical portion faces the central open portion, the inner surface includes the flexible gasket flap that extends inward from the inner surface of the cylindrical portion, a distal edge of the flexible gasket flap defines an opening, the opening configured to touch or seal against the positioner, and the flexible gasket flap configured to flex upward, thereby releasing gas from the container, or allowing air into the container depending on the pressure differential.

18. The stopper according to claim 13, wherein a flange portion of the vent gasket is configured to fit into an indentation on a lower surface of the bottom wall, and wherein the vent passages are molded in the bottom wall and are horizontally disposed.

19. The stopper according to claim 13, wherein the flexible gasket flap having a flexibility to give way or move upward when the pressure differential between the inside of the container and the ambient atmosphere is sufficient, thereby releasing pressure.

20. A stopper for a food jar, comprising:
    a stopper, the stopper configured to close an opening of a container;
    the stopper includes a bottom wall and a sidewall;
    a central recess formed in the bottom wall, the central recess includes a cylindrical wall defining a void;

one or more vent passages formed in the bottom wall;
the one or more vent passages have a first opening at the central recess and a second opening in the sidewall, and the one or more vent passages connecting the central recess and the sidewall;
a seal engaged to a lower portion of the stopper below the second opening in the sidewall;
a positioner that extends from the bottom wall and into the void of the central recess;
a vent gasket configured to at least partially fit into the void of the central recess;
the vent gasket defining a central open portion configured to receive the positioner; and
the central open portion comprising a flap configured to seal against the positioner and to automatically open under higher than ambient pressure conditions to relieve pressure.

* * * * *